United States Patent [19]

Kobayashi

[11] Patent Number: 5,066,235

[45] Date of Patent: Nov. 19, 1991

[54] CONNECTOR ASSEMBLY FOR ELECTRONIC DEVICES

[75] Inventor: Fumiyuki Kobayashi, Tokyo, Japan

[73] Assignee: NEC Corporation, Japan

[21] Appl. No.: 554,276

[22] Filed: Jul. 18, 1990

[30] Foreign Application Priority Data

| Jul. 21, 1989 | [JP] | Japan | 1-85859[U] |
| Jul. 27, 1989 | [JP] | Japan | 1-88778[U] |
| Jul. 17, 1990 | [JP] | Japan | 2-76019[U] |

[51] Int. Cl.$^5$ .............................................. H05K 7/00
[52] U.S. Cl. ...................................................... 439/76
[58] Field of Search ............................ 439/76, 66, 74; 361/395, 399

[56] References Cited

U.S. PATENT DOCUMENTS

| 3,290,636 | 12/1966 | Overtveld | 439/71 |
| 4,533,976 | 8/1985 | Suwa | 361/395 |
| 4,775,333 | 10/1988 | Grider et al. | 439/736 |

*Primary Examiner*—Neil Abrams
*Attorney, Agent, or Firm*—Laff, Whitesel, Conte & Saret

[57] ABSTRACT

A connector assembly which is adapted to be incorporated in an electronic device and which includes a spring connector having a spring contact of a plunger type or of a spring leaf type. The plunger type spring connector has a pin which forms the spring contact and which is slidably movable due to the spring force so that the pin is electrically in contact with a contact pattern on a printed circuit board stably and constantly. The spring leaf type connector has a leaf spring which forms at its extended bent portion the spring contact and which bent portion is movable due to the spring force so that the tip of the bent extended portion is electrically in contact with the contact pattern on the printed circuit board stably and constantly. The spring leaf type connector includes, in addition to the leaf spring, a terminal pin, a coil spring and a mounting rib. The mounting rib holds the leaf spring with the coil spring pressing the leaf spring against the mounting rib. The connector assembly having either type or both the types of spring connector may suitably be incorporated in an electronic device equipped with a printed circuit board or a power supply terminal.

4 Claims, 5 Drawing Sheets

CONNECTOR ASSEMBLY FOR ELECTRONIC DEVICES

BACKGROUND OF THE INVENTION

The present invention relates to a connector assembly for electronic devices and, more particularly, to a connector assembly having a spring connector as a means to interconnect printed circuit boards or to connect a power supply terminal with a printed circuit board.

With a conventional connector assembly of the kind to which the present invention relates, it is general that two printed circuit boards are connected with each other by means of a plug and socket connector or by means of wires. Where the plug and the socket are used, a problem encountered is that they may not fit together well unless the two printed circuit boards to which the plug and the socket are respectively fixed are precisely and accurately located. Where wires are used, the assemblage and the maintenance of the assembly are not easy especially because of the need of soldering both the ends of the wires in the fabrication of the assembly.

SUMMARY OF THE INVENTION

It is, therefore, an object of the invention to overcome the problems existing in the conventional arrangements and to provide an improved connector assembly for the interconnection between printed circuit boards or for the connection of a power supply terminal with a circuit board.

Another object of the invention is to provide an arrangement wherein the electrical contact between the elements concerned can be easily and stably established and assembly can be fabricated and maintained in a simpler manner.

Still another object of the invention is to provide a power supply connector assembly adapted to be used in an electronic device in which, when a pack holding section holds a battery pack, a power supply terminal of the battery pack is easily and stably connected to a power supply pattern terminal of a circuit board.

The present invention provides a connector assembly comprising:

at least one printed circuit board;

a contact pattern provided at least on one surface of such printed circuit board; and a spring connector having a spring contact of a plunger type movable by the spring force for being in contact with the contact pattern on the printed circuit board;

the connector assembly being adapted to be incorporated in an electronic device in such a way that the spring contact and the contact pattern are electrically in contact with each other stably and constantly.

The invention also provides a connector assembly adapted to be incorporated in an electronic device having a battery pack holding section defined by a wall of a housing case for holding a battery pack, the connector assembly comprising:

a contact pattern provided on the printed circuit board; and a spring connector having a spring contact of a leaf spring type movable by the spring force for being in contact with contact pattern on the printed circuit board;

the spring connector including a terminal pin having a head electrically connectable to the battery pack, a coil spring carried by the terminal pin, a terminal leaf spring having a bent extended portion forming the spring contact and having a base portion engaging with the terminal pin, and a mounting rib standing up from the housing case, each of the wall, the terminal leaf spring and the mounting rib having a hole through which the terminal pin extends and the mounting rib holding the terminal leaf spring with the coil spring pressing the terminal leaf spring against the mounting rib;

whereby the spring contact formed at the extended portion of the terminal leaf spring is in constant electric contact with the contact pattern on the printed circuit board.

BRIEF DESCRIPTION OF THE DRAWINGS

FIG. 1b is an enlarged sectional view of the portion A of FIG. 1a;

FIG. 2b is an enlarged sectional view of the portion B of FIG. 2a;

The exemplifications set out herein illustrate the preferred embodiments of the invention and such exemplifications are not to be construed as limiting in any manner.

PREFERRED EMBODIMENTS OF THE INVENTION

Throughout the following explanation, similar reference symbols or numerals refer to the same or similar elements in all the figures of the drawings.

For the purpose of assisting in the understanding of the present invention, a conventional connector assembly for printed circuit boards and the problems existing therein will first be described by making reference to FIGS. 5, 6 and 7 before the present invention is explained.

Figure 5:
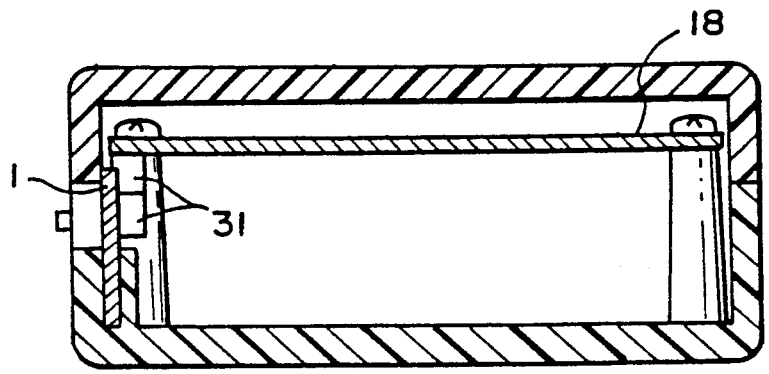
FIG. 5 is a sectional view showing a conventional connector assembly using a plug and socket connector.

FIG. 5 shows a conventional connector assembly in which printed circuit boards 1, 18 are electrically connected with each other by a plug and socket connector 31. Since the plug and the socket are fixed on the respective printed circuit boards 1, 18, the relative locations of the two printed circuit boards must be accurately fixed for the plug and the socket to fit together. In order to arrange that they do fit even when the relative locations of the two boards are not accurately made, some conventional assemblies have incorporated therein a connector which incorporates therein a certain floating mechanism but a disadvantage in such connector is that its manufacturing cost is high.

Figure 6:
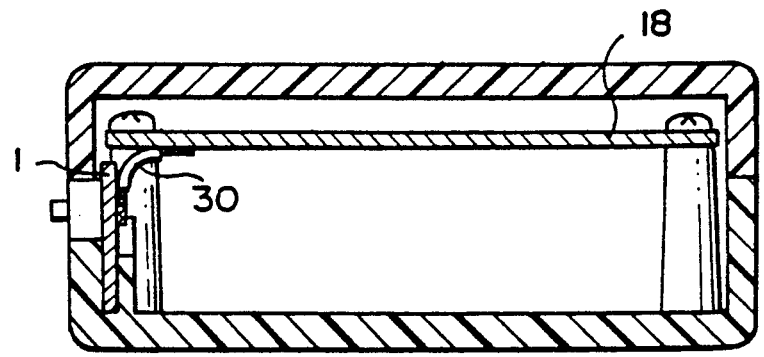
FIG. 6 is a sectional view showing a conventional connector assembly using a wire connection.

FIG. 6 shows another conventional connector assembly in which a wire 30 is used for connecting the printed circuit boards 1, 18 together. In this arrangement, the use of solder is required for connecting each of the two ends of the wire onto each of the printed circuit boards and this involves the complication in the assembling and disassembling and also in the handling of the wire itself.

Figure 7:
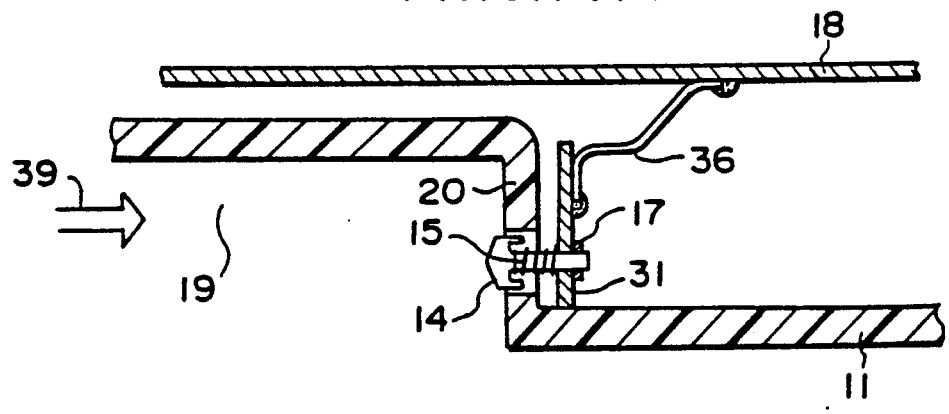
FIG. 7 is a sectional view showing a conventional connector assembly using also a wire connection.

FIG. 7 shows still another conventional connector assembly which is incorporated in a portable wireless device comprising a housing case 11 and a battery pack holding section 19 provided in the housing case 11. The battery pack holding section 19 holds a battery pack 37 (shown in FIG. 4c) which is inserted therein in the direction shown in an arrow 39. The battery pack 37 has a pair of power supply terminals which are compressed against a pair of terminal pins 14 which constitute power connecting terminals. It is to be noted that, where there are any members in a pair such as the case with these terminal pins 14, only one of such members is shown in the drawings. The housing case 11 carries therein a sub-circuit plate 31 having a hole for receiving therein the terminal pin 14 with an E-ring 17 being affixed at one end of the terminal pin 14. The terminal pin 14 carries a coil spring 15 so that, when the head of the terminal pin 14 is pressed by the power supply terminal of the battery pack 37, the terminal pin 14 moves against the spring force of the coil spring 15. The terminal pin 14 is electrically connected and conductive to the sub-circuit plate 31 and this plate 31 and a main base circuit plate 18 carrying various circuitry are electrically connected with each other by a wire 36. Solder is used for affixing both the ends of the wire 36 and this involves complicated internal arrangements and also involves complicated work in the fabrication and maintenance of the assembly.

In order to overcome the problems existed in the conventional arrangement, the present invention provides a connector assembly which is adapted to be incorporated in an electronic device and which includes a spring connector having a spring contact of a plunger type or of a spring leaf type. The plunger type spring connector has a pin which forms the spring contact and which is slidably movable due to the spring force so that the pin is electrically in contact with a contact pattern on a printed circuit board stably and constantly. The spring leaf type connector has a leaf spring which forms at its extended bent portion the spring contact and which bent portion is movable due to the spring force so that the tip of the bent extended portion is electrically in contact with the contact pattern on the printed circuit board stably and constantly. The spring leaf type connector includes, in addition to the leaf spring, a terminal pin, a coil spring and a mounting rib. The mounting rib holds the leaf spring with the coil spring pressing the leaf spring against the mounting rib. The connector assembly having either type or both the types of spring connector may suitably be incorporated in an electronic device equipped with a printed circuit board or a power supply terminal.

Now the present invention is explained in detail with reference to the appended drawings.

Figure 1A:
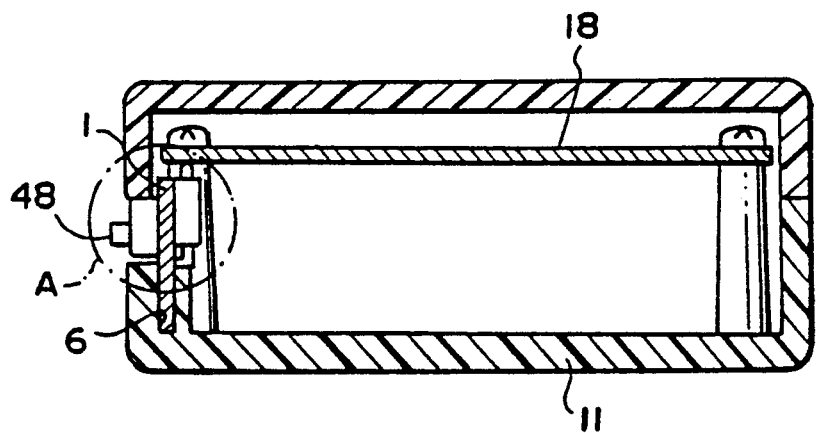
FIG. 1a is a sectional view showing a connector assembly as a first embodiment according to the present invention.
Figure 1B:
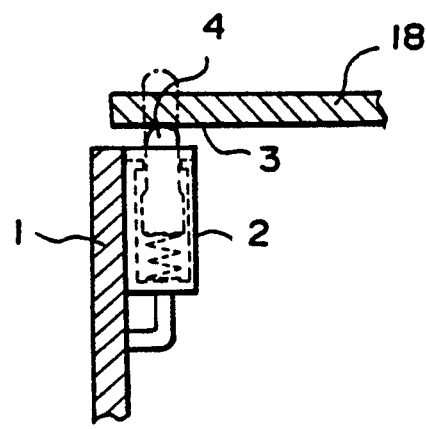

FIG. 1a is a sectional view showing an embodiment according to the present invention and FIG. 1b is an enlarged sectional view of the portion A in FIG. 1a.

In this embodiment, a spring connector 2 is fixed to a printed circuit board 1 and the former and the latter are electrically in contact with each other. A pin 4 forms a spring contact of a plunger type and is slidably movable due to the spring force of a spring disposed in the spring connector 2. The undersurface of the printed circuit board 18 carries a contact pattern 3 at the position where the pin 4 faces. The numeral 48 represents a mute button the location of which is more clearly seen in FIG. 4c.

According to this embodiment, the printed circuit board 1 is received in a groove 6 provided inside a case 11 and the printed circuit board 18 is fixed to the case 11 from above by such means as screws. In this state, the pin 4 of the spring connector 2 fixed on the printed circuit board 1 is pressed against the contact pattern 3 on the printed circuit board 18 due to the spring force. Therefore, the printed circuit board 1 and the printed circuit board 18 are electrically conductive.

Although the foregoing explanation refers only to the embodiment wherein the spring connector 2 is provided only on one printed circuit board 1, it is of course possible to use two or more such printed circuit boards with corresponding contact patterns being provided on the printed circuit board 18 and in this way it is possible to establish a number of connections for different purposes.

Figure 2A:
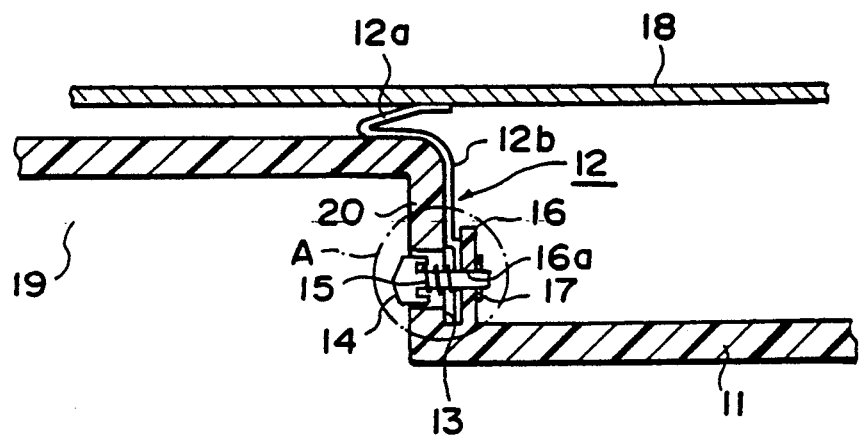
FIG. 2a is a sectional view showing a connector assembly as a second embodiment according to the present invention.
Figure 2B:
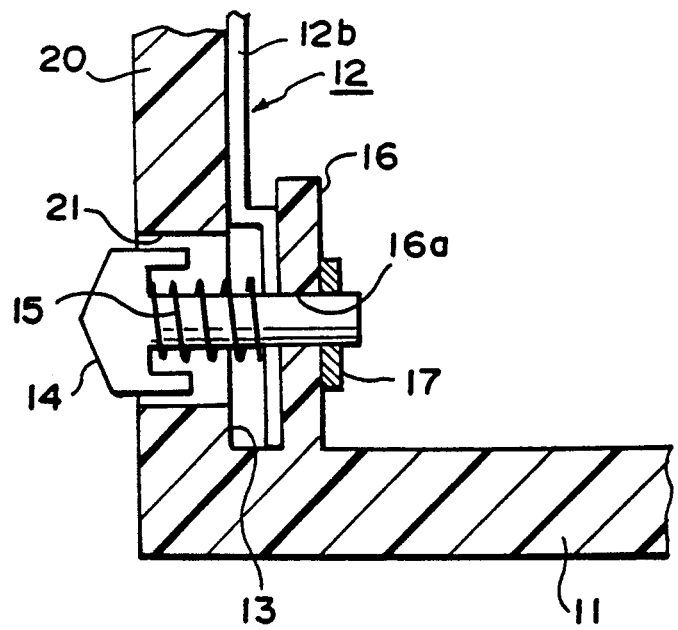
Figure 3:
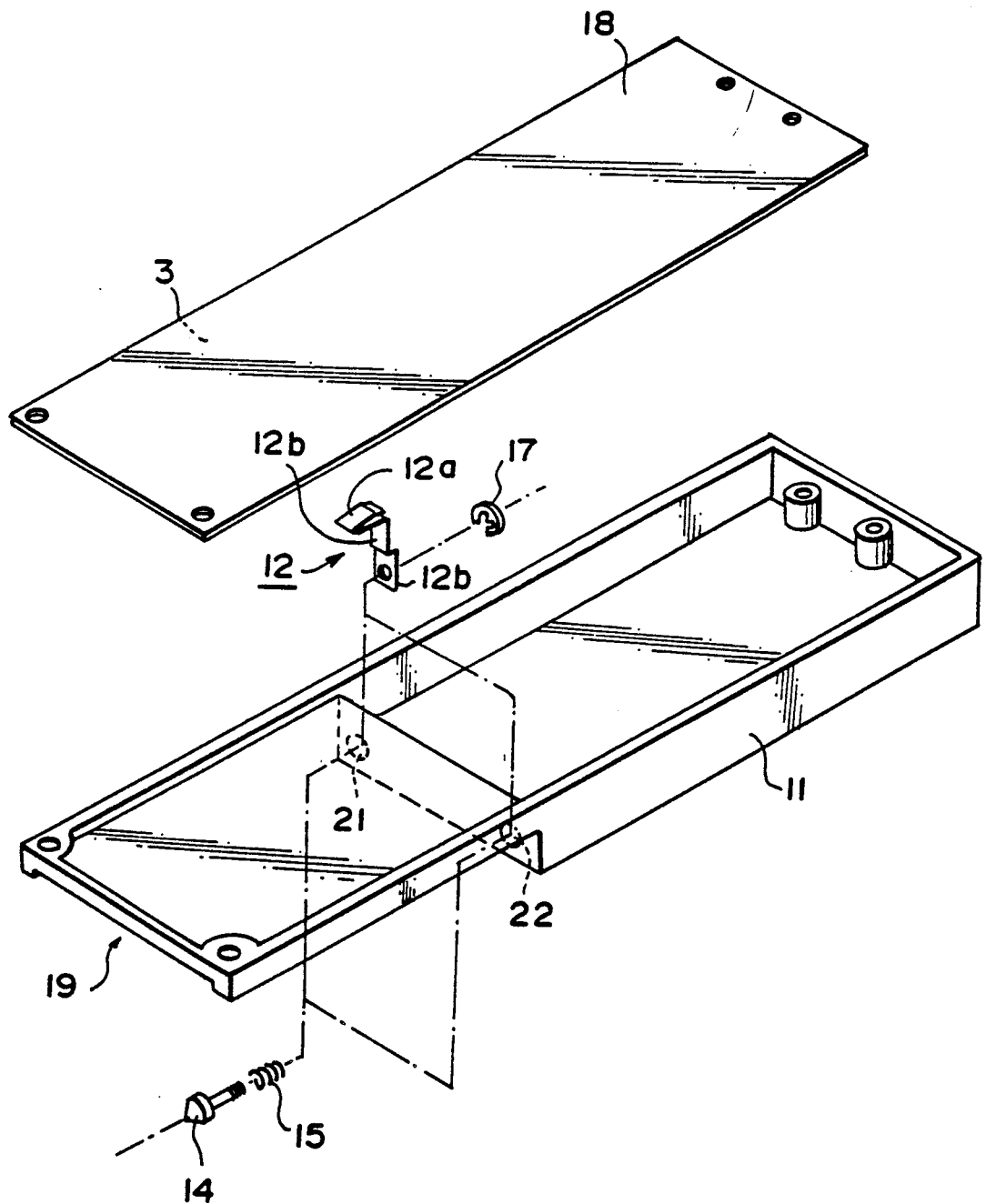
FIG. 3 is a perspective view showing the ways in which the connector assembly as shown in FIGS. 2a, 2b is assembled when incorporated in an electronic device.

FIGS. 2a and 2b show a power supply connector assembly which is a second embodiment according to the present invention and which corresponds to the conventional device shown in and explained with reference to FIG. 7. Generally it is to be understood that the drawings only show only one of the members (or parts) where such members are in a pair. For example, only a hole 21 is seen in FIG. 2a but there are a pair of holes 21, 22 as seen in FIG. 3.

The connector assembly shown in FIGS. 2a and 2b is adapted to be incorporated in an electronic device having a battery pack holding section 19 defined by a wall of a housing case 11 for holding a battery pack 37. There is a printed circuit board 18 which carries at its undersurface a contact pattern 3. The spring connector 12 includes a terminal pin 14 having a head electrically connectable to the battery pack 37 (see FIGS. 3 and 4c), a coil spring 15 carried by the terminal pin 14, a terminal leaf spring 12b having a bent extended portion forming a spring contact 12a and having a base portion engaging with said terminal pin 14, and a mounting rib 16 standing up from the housing case 11. Each of the wall 20, the terminal leaf spring 12b and the mounting rib 16 has a hole through which the terminal pin 14 extends and the mounting rib 18 holds the terminal leaf spring 12b with the coil spring 15 pressing the terminal leaf spring 12b against the mounting rib 16. Thus, the spring contact 12a formed at the tip of the extended bent portion of the terminal leaf spring 12b is in constant electric contact with the contact pattern 3 on the printed circuit board 18.

The spring connector 12 includes an E-ring 17 which engages with the terminal pin 14 at its end portion projecting out from the mounting rib 16. This E-ring 17 serves as a stopper and the terminal pin 14 and the terminal leaf spring 12b are held to the mounting rib 16. The housing case 11 includes a groove 13 defined between the wall and the mounting rib 16 for receiving the terminal leaf spring 12b in position. The terminal leaf spring 12b directly rests on the inner surface of the wall of the case 11.

The terminal pin 14 and the coil spring 15 in the arrangement according to this embodiment correspond to and similarly arranged as the terminal pin 14 and the coil spring 15 in the conventional arrangement shown in FIG. 6. However, the terminal leaf spring 12b in this embodiment replaces the sub-circuit plate 31 and the wire 36 shown in the conventional arrangement of FIG. 6. The extended portion 12a of the leaf spring 12b is bent in a V-shape for forming the spring contact.

FIG. 3 shows how the power supply connector assembly having the configuration explained with reference to FIG. 2a is assembled when used in an electronic device.

The electronic device exemplified herein comprises a housing 11 which has a battery pack holding section 19 for holding a battery pack 37 and a printed circuit board 18 which is pressed against and fixed by appropriate means such as screws to the housing case 11. The printed circuit board 18 has, on its back surface, printed circuits or contact patterns and carries, on its front side, such means as a liquid crystal display and a keyboard (see FIG. 4b). Spring connector 12 stands upward from the housing case 11. The contact patterns or pattern terminals on the printed circuit board 18 are in contact with the spring contacts 12a of the spring connector 12 with the extended bent portion of the terminal leaf spring 12b being pressed against the pattern terminals on the printed circuit board 18. The constant compression is due to the spring force of the terminal leaf spring 12b and this ensures stable and constant electrical contact between the printed circuit board 18 and the terminal leaf spring 12b and, in turn, between the terminal pin 14 and the printed circuit board 18.

According to this second embodiment, the power supply connection terminal for connecting the battery pack 37 to the printed circuit board 18 in a device such as a portable wireless telephone device includes the terminal pin 14, the coil spring 15 and the terminal leaf spring 12b with the arrangement wherein the extended bent portion of the terminal leaf 12b spring forming the spring contact 12a is directly in press-contact against the contact pattern on the printed circuit board 18. The corresponding conventional connector assembly configuration described requires the sub-base plate 31 for the power supply terminal, and the sub-base plate 31 and the main circuit plate 18 are connected with each other by the wire 36. The connector assembly according to this embodiment is simpler as it does not require such members as the sub-base plate 31 and the wire 36. With this configuration, the connection with printed circuit board 18 can be easily established and the assembly can be fabricated and maintained in a simpler manner than in the corresponding conventional assembly as shown in FIG. 7.

Figure 4:
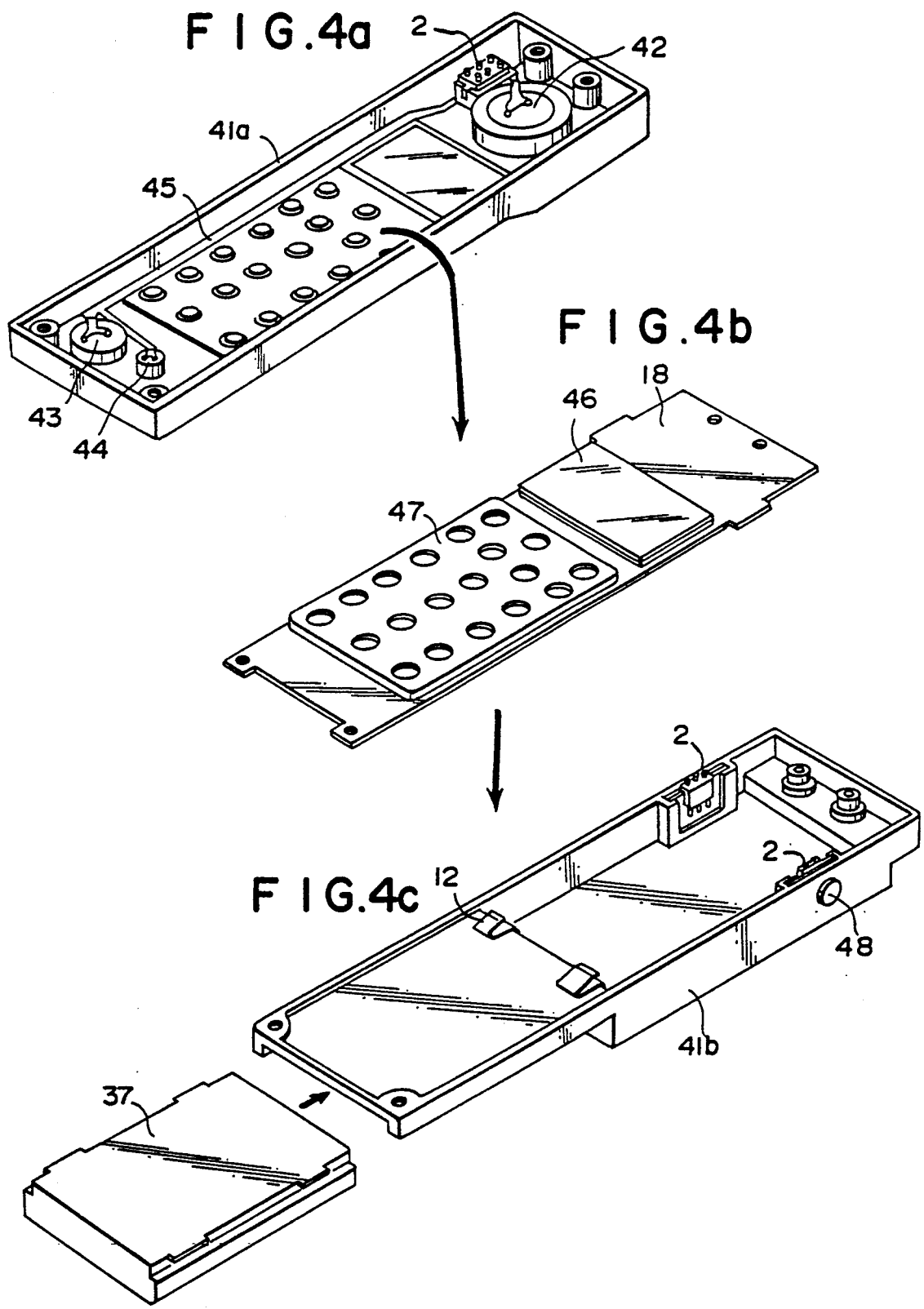
FIGS. 4a, 4b and 4c are perspective views of a disassembled telephone device in which the connector assemblies shown in FIGS. 1a, 1b and FIGS. 2a, 2b are both incorporated, FIG. 4a illustrating a front cover of the device shown downside up.

FIGS. 4a, 4b and 4c show an example wherein the power supply connector assembly as shown in FIGS. 1a, 1b and that shown in FIGS. 2a, 2b are incorporated in a wireless telephone device. FIG. 4a illustrates a front cover 41a of the telephone device, shown downside up, which includes spring connectors 2, an earpiece 42, a speaker 43 and a mouthpiece microphone 44. The front cover 41a also includes a flexible printed circuit board 45 which is in contact with the spring connector 2. FIG. 4b shows a printed circuit board 18 which includes the necessary number of contact patterns for connections with the related spring connectors and other circuit-related parts such as a liquid crystal display 46 and a keyboard 47. FIG. 4c shows a rear case 41b (which corresponds to the housing case 11 in FIGS. 2a and 3), from which it is seen that the device incorporates therein both the types of spring connectors, one being the plunger type spring connectors 2 and the other being the leaf spring type spring connector 12. The plunger type spring connectors 2 in the front cover 41a and those in the rear case 41b sandwich the printed circuit board 18 and establish electric contacts with the front and the rear surfaces of the circuit board 18 while the leaf spring type spring connector 12 establishes electric connection from the battery pack 37 to the printed circuit board 18.

While the invention has been described in its preferred embodiments, it is to be understood that the words which have been used are words of description rather than limitation and that changes within the purview of the appended claims may be made without departing from the true scope and spirit of the invention in its broader aspect.

What is claimed is:

1. A connector assembly adapted to be incorporated in an electronic device having a printed circuit board a battery pack holding section defined by a wall of a housing case for holding a battery pack, said connector assembly comprising:
   a contact pattern provided on said printed circuit board; and
   a spring connector having a spring contact of a leaf spring type movable by the spring force for being in contact with said contact pattern on said printed circuit board;
   said spring connector including a terminal pin having a head electrically connectable to said battery pack, a coil spring carried by said terminal pin, a terminal leaf spring having a bent extended portion forming the spring contact and having a base portion engaging with said terminal pin, and a mounting rib standing up from said housing case, each of said wall, said terminal leaf spring and said mounting rib having a hole through which said terminal pin extends and said mounting rib holding said terminal leaf spring with said coil spring pressing said terminal leaf spring against said mounting rib;
   whereby the spring contact formed at the extended portion of said terminal leaf spring is in constant electric contact with the contact pattern on said printed circuit board.

2. A connector assembly according to claim 1 in which said terminal leaf spring directly rests on the inner surface of said wall and said terminal leaf spring is in a V-shape at its extended portion forming the spring contact.

3. An electronic device having a case including a battery pack holding section defined by a wall at a rear of said case for holding a battery pack, a printed circuit board carrying on its back surface a contact pattern, and a spring connector for establishing an electric contact with said contact pattern, said spring connector comprising:
   a spring contact which is movable by the spring force to be in contact with said contact pattern, a terminal pin having a head electrically connectable to said battery pack, a coil spring carried by said terminal pin, a terminal leaf spring having a bent extended portion forming a spring contact and having a base portion engaging with said terminal pin, and a mounting rib standing up from said housing case, each of said wall, said terminal leaf spring and said mounting rib having a hole through which said terminal pin extends and said mounting rib holding said terminal leaf spring with said coil spring pressing said terminal leaf spring against said mounting rib;

whereby the spring contact formed at the extended portion of said lead spring is in constant electric contact with the contact pattern on the back surface of said printed board circuit.

4. An electronic device according to claim 3 in which said case also carries a spring connector having a plunger type spring contact for establishing electric contact with said contact pattern on the printed circuit board, said spring contact being slidably movable by the spring force for being in contact with said contact pattern on the printed circuit board.

* * * * *